P. W & H. G. BRIGGS.
Grain-Drill.

No. 198,271.  Patented Dec. 18, 1877.

UNITED STATES PATENT OFFICE.

PHILANDER W. BRIGGS AND HIRAM G. BRIGGS, OF HOWELL, MICHIGAN.

IMPROVEMENT IN GRAIN-DRILLS.

Specification forming part of Letters Patent No. 198,271, dated December 18, 1877; application filed October 12, 1877.

*To all whom it may concern:*

Figure 1:
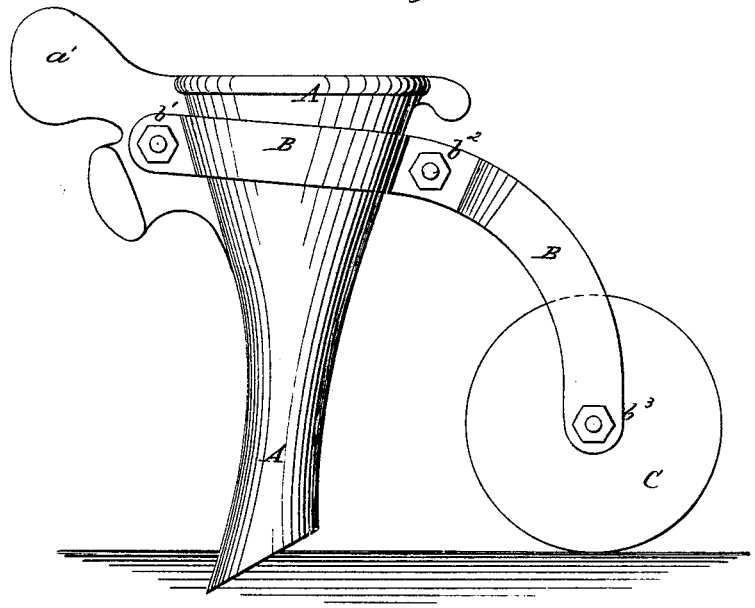
Figure 2:
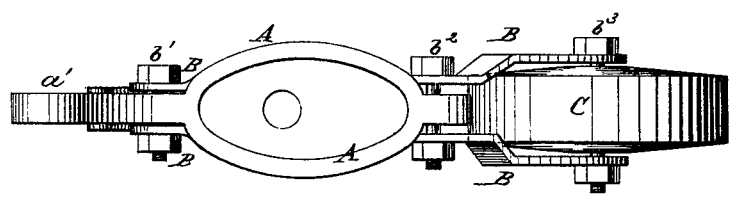

Be it known that we, PHILANDER WARREN BRIGGS and HIRAM GOODIN BRIGGS, of Howell, in the county of Livingston and State of Michigan, have invented a new and useful Improvement in Grain-Drills, of which the following is a specification:

Figure 1 is a side view of a drill-tooth, clamp, and wheel. Fig. 2 is a top view of the same.

Similar letters of reference indicate corresponding parts.

The object of this invention is to improve the construction of grain-drills in such a way that the grain may be put into the soil to any desired depth, that the grain will not be covered too deeply when it may be advisable to run the drills zigzag, and that will prevent the loose stones from falling upon the grain, and preventing it from coming up properly.

The invention will first be described in connection with the drawing, and then pointed out in the claim.

A is the drill-tooth, which is made hollow, to serve as a spout to conduct the seed to the ground. The upper end of the tooth A is made flaring or funnel shaped, to receive the grain, and its lower end is made slightly flaring, and is beveled off upon the rear side.

B are two bars, the forward ends of which are connected by a bolt, $b^1$, to each other, and to the lug or arm $a'$, formed upon the forward side of the upper end of the tooth A, for connecting it with the frame of the machine and drawing it. The forward parts of the bars B are so formed as to fit upon the upper part of the tooth A, and are connected together at the rear of said tooth A by a bolt, $b^2$, so as to securely clamp and hold the said tooth. The rear parts of the clamping-bars B are spread apart, and curved downward, and to and between them is pivoted the wheel C by a bolt, $b^3$.

The wheel C acts as a gage-wheel, to regulate the depth to which the tooth A enters the ground, and its rim is made wide to adapt it to serve also as a roller to cover the seed.

By this construction, by loosening the bolt $b^2$, the tooth A may be adjusted to enter the ground to any desired depth.

By this construction the seed being covered by the action of the wheels C will be covered to a uniform depth, and the seed deposited by the forward teeth cannot be covered any deeper by the action of the following teeth, as it is liable to be when covered with plows or hoes.

We are aware that it is not new to use gage-wheels with the hollow teeth of drills; but heretofore they have not been provided with an attachment by which they may be secured to the teeth now in public use.

What we claim as new and of our invention is—

A gage-wheel, adjustably connected with a drill-tooth by the bars B B, bolts $b^1$ $b^2$ $b^3$, and the forward lug $a'$ on the hollow tooth, as shown and described.

PHILANDER WARREN BRIGGS.
HIRAM GOODIN BRIGGS.

Witnesses:
E. B. GREGORY,
THOS. FRASER.